United States Patent Office 3,309,279
Patented Mar. 14, 1967

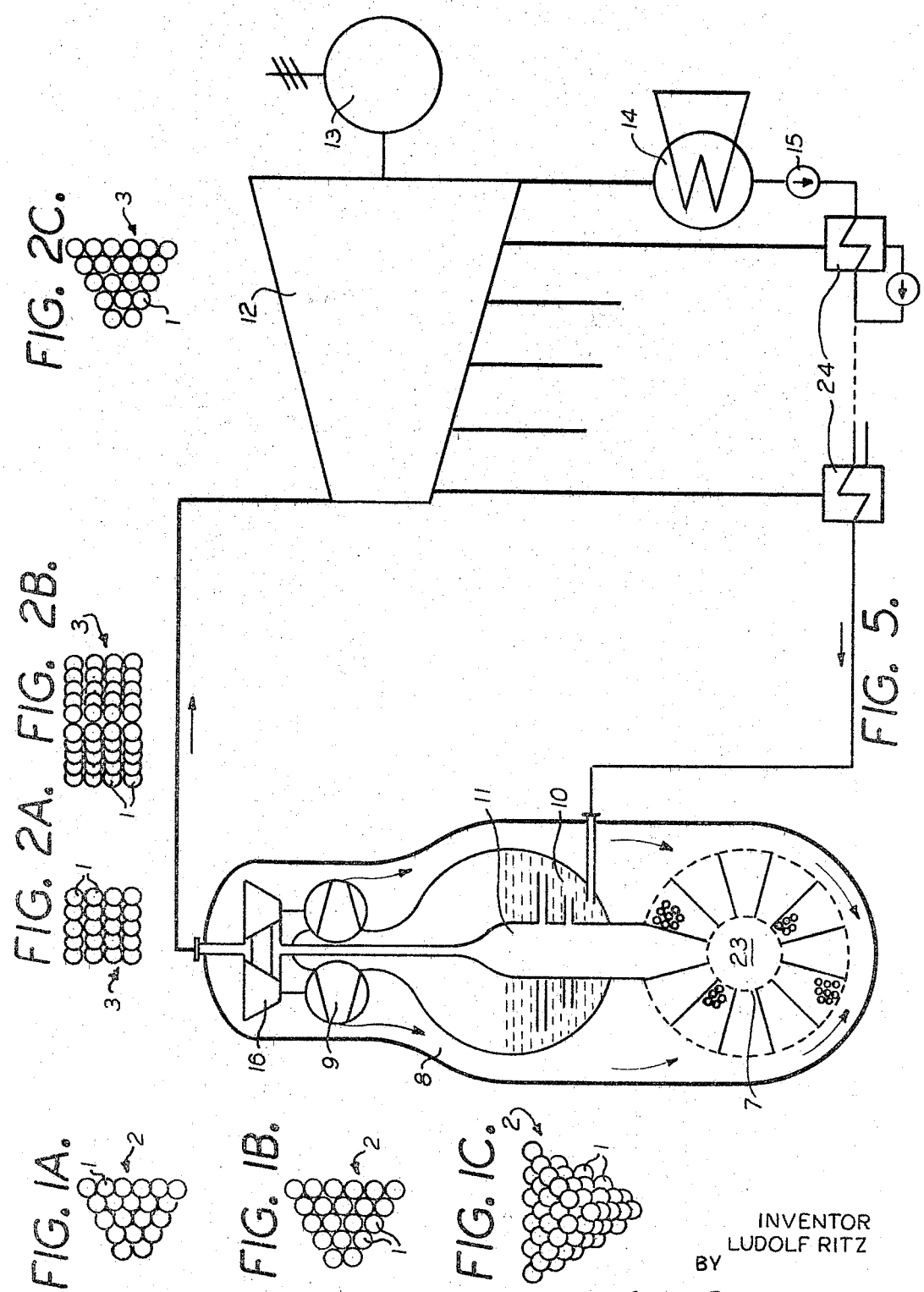

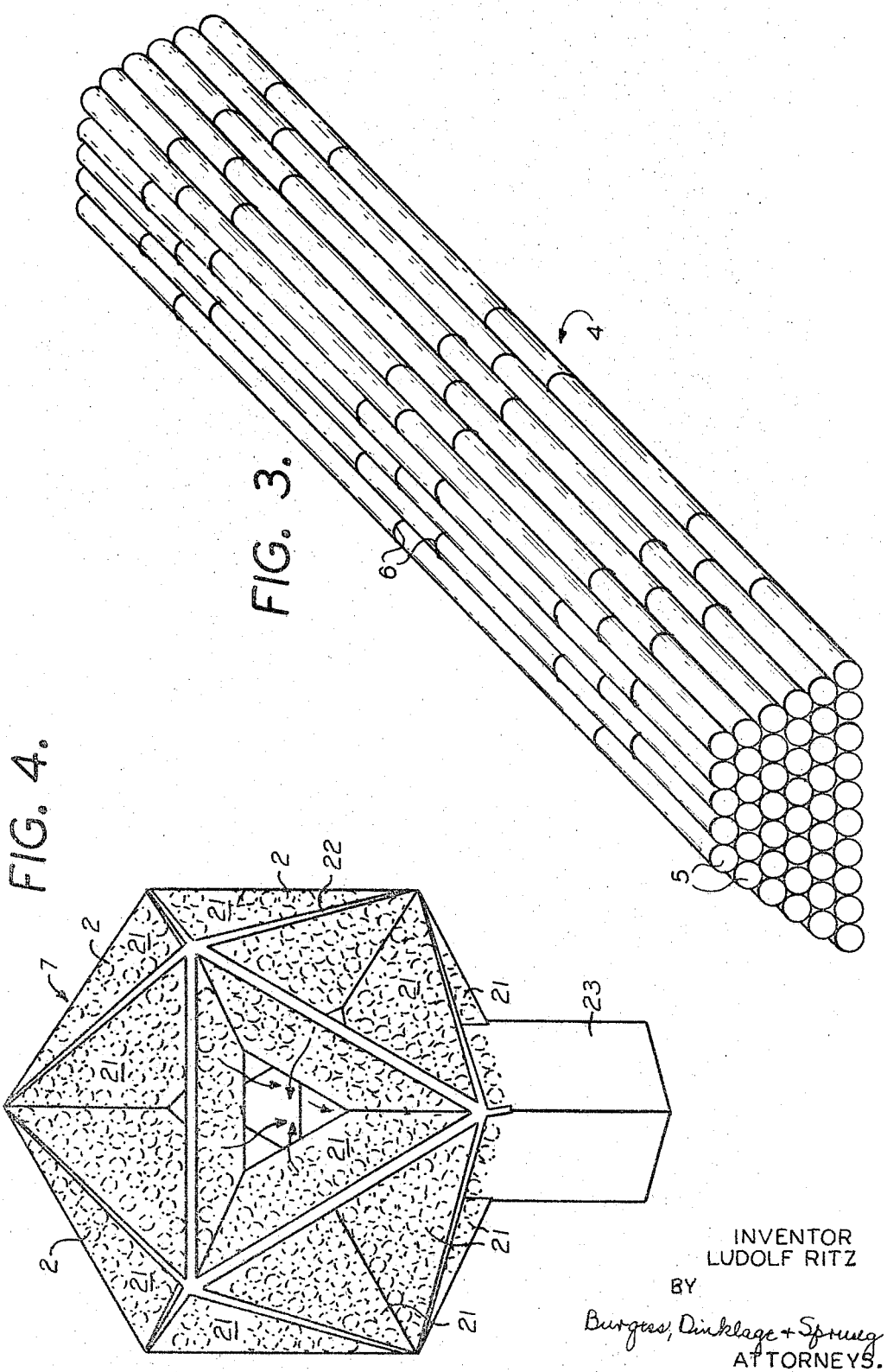

3,309,279
GAS COOLED NUCLEAR REACTOR CORE AND STEAM GENERATOR PLANT EMBODYING SAME
Ludolf Ritz, Karlsruhe, Germany, assignor to Gesellschaft fuer Kernforschung m.b.H., Karlsruhe, Germany, a corporation of Germany
Filed Sept. 12, 1963, Ser. No. 318,135
Claims priority, application Germany, Sept. 15, 1962, K 47,734, K 47,735; Sept. 25, 1962, K 47,809
19 Claims. (Cl. 176—40)

The invention relates to nuclear reactors, particularly to those achieving high thermal ratings in the core, as occur for example in fast breeders, and which are cooled by gaseous fluids. The term gaseous fluid should be understood in the widest sense to include such fluids as steam. In this case one part of the steam having cooled the core and consequently been superheated, is led to a power generator followed by a condensing plant, while the other part of the steam is used to evaporate the condensate.

The economy of nuclear reactors is essentially determined by the capital cost of the plant. One way of keeping these costs low is by producing as large a quantity of heat as reasonably possible in a core of given size. The method of removing the heat from a highly rated core decisively determines the maximal temperatures occuring. To ensure a high efficiency in the use of the available heat it is desirable that the thermal energy be converted into mechanical energy at a suitable high temperature.

The conventional cooling fluids can normally not be used in nuclear reactors working with fast neutrons. Such reactors have therefore been built with liquid metals, i.e. sodium, as coolant. The resulting cooling circuits are, however, relatively uneconomical due to the complex and expensive plant involved. It has therefore been suggested to cool fast reactors with gases. The economy of gas cooled circuits is relatively low as the pumping power required to force the coolant through the multitude of the normally parallel cooling channels of constant cross section is high. Another disadvantage of the known gas cooled nuclear reactors is that the cooling of the fuel elements is far from uniform and that consequently their surface temperatures differ considerably. Ultimately the provision of an effective emergency cooling is practically impossible in the case of highly rated reactors.

The main objective of the invention is to achieve a nearly constant temperature of the fuel elements in the whole core combined with a low pumping power. This is best obtained by arranging the smallest cross section of the cooling channels to be in the proximity of the region of greatest heat generation. In doing so the cross section of the cooling channels are so adjusted and the coolant flow so directed that the regions of largest temperature difference between coolant and fuel element surface are associated with low coolant velocities and temperatures and vice versa.

A particularly advantageous arrangement to the reactor according to the invention has a spherically shaped core consisting of a multitude of suitable packed and at least approximately spherical fuel elements. The coolant, preferably as gas, enters the core from the outside and leaves it through a radially arranged duct starting near the center of the spherical core. By this arrangement of the core uneconomically high pressure drops, and the resulting high pumping losses are avoided. Assuming for example that the conversion of thermal into mechanical energy is favourably carried out at a steam temperature of 540° C., the fuel element surface will be at a temperature of about 650° C. and higher. Whereas, in known reactors only a part of the elements or only sections of individual elements operate at the envisaged working temperature, the arrangement of the nuclear reactor and in particular of its core according to the invention provides a fairly uniform temperature of all the fuel elements, i.e. full use is made of the inherent capability of the fuel elements to work up to a certain temperature. This leads to a further improvement in the efficiency.

The construction of such a core provides, for example, for a spherical shell in which the fuel elements are arranged in the form of several frustrums of pyramids. The coolant is extracted out of the centrally resulting void through a discharge duct after having passed through the spherical shell in a radially inward direction. The gas thus enters the outer layers of the spherical shell with low velocity causing only low pressure losses. Consequently the heat transfer coefficient remains low in this region and therefore the largest temperature differences between the relatively cool gas and the fuel elements occur in this region. As the gas proceeds into the shell so the flow cross section decreases, and thus the flow velocity and resulting heat transfer coefficient increases. The highest velocity occurs at the exit of the gas out of the shell into the central void. The increase in heat transfer coefficient associated with the high flow velocity causes nearly the same surface temperature of the fuel elements to be maintained in the inner as in the outer regions in spite of the increasing coolant temperature. This means that the gas flow as well as the heat transfer have been arranged in the most favourable way regarding pressure loss and heat removal, with the result that the pumping power needed to circulate the gas is small.

Such an arrangement of the nuclear reactor, and in particular the core has the further considerable advantage that a uniform temperature increase of the coolant is ensured in all flow passages, resulting in a uniform exit temperature and therefore avoiding local overheating.

According to the invention the fuel elements can alternatively be arranged in the form of a thick walled hollow cylinder forming the core, into which the coolant enters radially from the outside and out of which the coolant is removed from the center in an axial direction. This arrangement results principally in the same advantages as the spherical arrangement described above.

To ensure optimal economy of the nuclear reactor envisaged in the invention it is furthermore essential that the fuel elements be capable of withstanding high working temperature and pressures over long periods. Heat resisting metal alloys, with good corrosion and irradiation properties used as canning material though ceramic materials, e.g. beryllium oxide can also be used. Beryllium oxide or other materials of high thermal conductivity and melting point can furthermore be added to the preferably ceramic fuel, to increase its thermal conductivity. Especially in fuel elements with beryllium oxide a uniformly high working temperature is of particular advantage, as beryllium oxide ceases to disintegrate under the action of fast neutrons when the working temperature is above approximately 300° C. Furthermore, beryllium oxide has, from the nuclear points of view additional advantages, so that the use of beryllium oxides often ensure the most suitable design of the fuel elements.

Should spherical fuel elements with metal cladding be used in the nuclear reactor envisaged in the invention these provide the advantage that with the use of a relatively small quantity of alloyed cladding material very rigid fuel elements are obtained, capable of withstanding the high stresses occuring in reactors working with fast neutrons in which high burnout is obtained resulting in high fission gas pressures.

Though the use of spherical fuel elements will be in many cases most suitable in spherical or cylindrical cores, the use of cylindrical fuel elements can offer advantages in cylindrical cores as they can readily be arranged in subassemblies. Spheres can also be arranged in the form of regular subassemblies. These assume in the case of spherical cores the form of frustrums of pyramids, while in cylindrical cores these are prisms with triangular or trapezoidal cross section. The cylinder is made up of six prisms and the sphere of 14 to 20 pyramids.

The permissible thickness of the walls of the sphere or cylinder depends on the diameter of the fuel elements. With increasing diameter the pressure drop decreases for a given length of flow path and therefore a greater thickness can be used. If a high specific heat rating necessitates the use of small fuel element diameters to avoid melting of the fuel, the core will be composed of a multitude of spherical or cylindrical fuel element assemblies.

Further details of the invention are explained by means of drawings:

FIG. 1 shows a typical subassembly of spherical fuel elements arranged in the form of a frustum of a triangular pyramid, with FIGS. 1(A) and 1(B) representing side views of the subassembly, and FIG. 1(C) being a top view of said subassembly, looking normally toward the base thereof.

FIG. 2 shows a typical subassembly of the spherical fuel elements arranged in the form of a trapezoidal prism, with FIG. 2(A) being a side view taken normal to one of the inclined sides, FIG. 2(B) being a side view taken normal to the base side, and FIG. 2(C) being an end view.

FIG. 3 is a perspective view of a typical subassembly of cylindrical fuel elements arranged in the form of a trapezoidal prism.

FIG. 4 is a perspective view of a supporting structure for holding the pyramidal fuel element subassemblies of FIG. 1 so as to form a spherical reactor core, and showing a radially disposed coolant exit duct.

FIG. 5 is a schematic of nuclear power plant which utilizes a reactor core constructed in accordance with the invention.

As shown in FIG. 1, a plurality of spherically shaped fuel elements 1 are arranged together to form a subassembly 2 which is in the configuration of a frustum of a pyramid having a triangular cross section. These subassemblies 2 are inserted into the compartments 21 provided in the supporting structure 22 shown in FIG. 4, to form a reactor core 7. The number and arrangement of the compartments 21 in the supporting structure 22 are such as to form a core 7 which is a polyhedron substantially approximating a sphere. For obvious reasons, a regular polyhedron is preferable to an irregular one for the supporting structure 22, and the greater the number of sides, or faces, each corresponding to an individual compartment 21, the closer is the spherical approximation. For example, a core 7 having 14 to 20 pyramidal compartments 21, and correspondingly the same number of fuel element subassemblies 2, is suitable.

It is to be noted that the subassemblies 2 are inserted into the compartments 21 with their base sides facing the exterior of the structure 22, and accordingly, the compartments 21 are so arranged.

Thus as is evident in FIG. 4, the truncated ends of the pyramidal assemblies 2 are disposed around the central interior region of the core 7, thereby providing an open region thereat, bounded so as to form a polyhedron similar to that of the core 7 exterior surface.

As shown in FIG. 4, a radially disposed coolant discharge duct 23 is provided in the support structure 22, said duct 23 extending through the exterior polyhedral boundary established by the compartments 21, into the open central interior region and communicating therewith.

In the operation of the reactor core 7, the coolant is introduced through the exterior of said core 7, preferably uniformly distributed, and flows radially inward through the passages defined by the voids in the fuel element assemblies 2, into the open central interior region, and out through the duct 23. Thus, at the exterior regions of the core 7, the coolant flow velocity is the lowest, by reason of the relatively large flow area (spherical), and the flow velocity increases progressively inward, reaching a maximum at the central interior region where the coolant enters the duct 23.

Thus the radially inward coolant flow provided in the reactor core 7 of the invention provides a more uniform temperature throughout said core 7, since the heat transfer from the fuel elements 1 to the coolant, which increases with flow velocity, is maximum at the hottest region, the center of the core 7, and diminishes towards the outer, and cooler regions of the core 7.

The use of a radially inward coolant flow in accordance with the invention is not limited to spherical cores 7 but may be provided in other core shapes as well, for example, cylindrical cores.

As shown in FIG. 2, the spherical fuel elements 1, are arranged together so as to form a trapezoidal prismatic subassembly 3. A plurality of these prismatic subassemblies 3 can be assembled together so as to form a cylindrical core having an open central bore (not shown). A duct, similar to the one provided in the case of the spherical core can be used to remove coolant from the interior of such a cylindrical core, so as to provide similar cooling characteristics when the coolant is introduced through the exterior of said core.

Although cylindrical reactor cores can be assembled from trapezoidal prismatic subassemblies 3, having spherical fuel elements 1, similar prismatic subassemblies composed of a plurality of cylindrical fuel rods 5 may also be used. In FIG. 3, a trapezoidal prism subassembly 4, similar to the subassembly 3, and composed of the cylindrical fuel rods 5, is shown. To insure that uniform spacings are maintained between the fuel rods 5, the rods are arranged in the openings of a wire mesh 6.

In the nuclear steam power plant shown schematically in FIG. 5, the reactor core 7 for producing superheated steam and an evaporator 10 are housed within a common pressure vessel 8. The evaporator 10 is arranged above the core 7 so that part of the superheated steam leaving said core 7 can be led directly into the evaporator 10 and the water content of said evaporator 10 can be used for flooding the core 7, thus providing additional cooling and reducing the reactivity within the core 7 in the event of a breakdown or nuclear excursion.

While the coolant fluid contemplated therein is steam, other suitable coolant fluids, including those which can also act as moderators can be used. A steam turbine 16 also located within the pressure vessel 8, along with a blower 9 provides for the circulation of the steam coolant through the core 7.

In the interest of maintaining a high overall efficiency of the plant, the turbine 16 which drives the blower 9 is placed before the work turbine 12 in the steam cycle, thus making use of a temperature range above that available to the work turbine 12 for metallurgical reasons. The superheated steam coolant leaving the core through the duct 23 is led to a distributor 11, situated above the core 7 and within the pressure vessel 8, which diverts part of said steam flow into the evaporator 10, and leads the main portion thereof into the work turbine which drives the generator 13. The steam passes through the work turbine 12 and is condensed by a condenser 14. The condensate produced is transferred by a pump 15 via a preheater 24, to the evaporator 10.

What I claim is:

1. A gaseous fluid cooled nuclear reactor core which comprises:
   (a) A plurality of fuel elements packed together so as to have voids which define a plurality of passages extending from the exterior boundary of said packed fuel elements into the central interior portion thereof, and form an open region thereat which passages decrease in size progressively inwardly to said open region.

(b) Means for introducing a gaseous fluid coolant into said passages through their terminations at the exterior boundary of said packed fuel elements; and (c) A radially disposed coolant discharge duct extending through the exterior boundary of said packed fuel elements and into the central interior portion thereof, said duct having an entrance communicating with the open region thereat, whereby the gaseous fluid coolant flows radially inward from the boundary of said packed fuel elements, into said open region and out through said coolant discharge duct, thereby providing a manner of cooling for said fuel elements wherein the heat transfer rate and coolant flow velocity increase in a radially inward direction from said exterior boundary and are maximum at the entrance to the coolant discharge duct.

2. The gaseous fluid cooled nuclear reactor core of claim 1 wherein the entrance to the coolant discharge duct is located in the region of maximum heat generation within the core.

3. The reactor core of claim 1 wherein the fuel elements are substantially spherical, and are packed together so as to form a substantially spherical core.

4. The reactor core of claim 1 wherein the fuel elements are substantially spherical, and are packed together so as to form a substantially cylindrical core having a hollow central interior region communicating with the coolant discharge duct.

5. The reactor core of claim 1 wherein the fuel elements are cylindrical.

6. The reactor core of claim 5 wherein the cylindrical fuel elements are disposed within the openings of a wire mesh and held in a predetermined spaced relation thereby.

7. The reactor core of claim 3 wherein the spherical fuel elements are assembled into a plurality of pyramidal subassemblies and said subassemblies are installed in a supporting structure to form a substantially spherical core.

8. The reactor core of claim 4 wherein the spherical fuel elements are assembled into a plurality of prismatic subassemblies, and said subassemblies are arranged so as to form the substantially cylindrical core.

9. The reactor core of claim 5 wherein the cylindrical fuel elements are assembled into a plurality of prismatic subassemblies, and said subassemblies are arranged so as to form a substantially cylindrical core.

10. The reactor core of claim 1 wherein the fuel elements are clad with metal having heat, corrosion and irradiation resisting properties.

11. The reactor core of claim 1 wherein the fuel elements contain ceramic fuels including beryllium oxide.

12. The reactor core of claim 1 wherein the coolant also acts as a moderator.

13. The reactor core of claim 1 wherein a moderator material is disposed within the passages defined by the fuel element voids in addition to the coolant flowing therethrough.

14. A nuclear powered steam generator comprising:

(a) A common pressure vessel;

(b) A reactor core disposed within said pressure vessel, said reactor core including a plurality of fuel elements packed together so as to have voids which define a plurality of passages extending from the exterior boundary of said packed fuel elements into the central interior portion thereof and form an open region thereat, which passages decrease in size progressively inwardly to said open region, means for introducing a gaseous fluid coolant into said passages through their terminations at the exterior boundary of said packed fuel elements, and a radially disposed coolant discharge duct extending through the exterior boundary of said packed fuel elements and into the central interior portion thereof, said duct having an entrance communicating with the open region thereat, to accommodate the discharge of gaseous fluid coolant which flows radially inward from the boundary of said packed fuel elements through said passages, into said open region and out through the coolant discharge duct to provide a manner of cooling said fuel elements wherein the heat transfer rate and coolant flow velocity increase in a radially inward direction from said exterior boundary and are maximum at the entrance to the coolant discharge duct; and, (c) An evaporator, also disposed within said pressure vessel, said evaporator having a condensate water chamber, means for introducing condensate into said chamber, and a superheated steam distributor extending through said chamber, said distributor having an inlet which communicates with the coolant discharge duct of the reactor core, an outlet which communicates with the exterior of said pressure vessel, and means for diverting superheated steam into the condensate chamber to evaporate the condensate within, and said condensate chamber having an outlet communicating with the interior of the pressure vessel, whereby condensate evaporated within said chamber in response to heat generated by nuclear reactions within the reactor core passes through said chamber outlet, into the interior of the pressure vessel, and thence through the reactor core, cooling said core and emerging therefrom as superheated steam, through the coolant discharge duct, and into the distributor wherein a portion of said superheated steam is diverted to further evaporate the condensate within said chamber, and the remaining portion of said superheated steam passes out through the distributor outlet, thus providing for the continuous generation of superheated steam from condensate by the heat produced by nuclear reactions within the core.

15. The nuclear powered steam generator of claim 14 wherein the evaporator is disposed within the pressure vessel above the reactor core.

16. The nuclear powered steam generator of claim 15 wherein the condensate chamber of the evaporator is of such capacity as to provide sufficient water to flood the reactor core, and means are provided for releasing said condensate water to flood said core.

17. The nuclear powered steam generator of claim 14 wherein a blower is provided within the pressure vessel for the circulation of coolant steam through the reactor core.

18. The nuclear powered steam generator of claim 17 wherein a turbine, disposed within the pressure vessel, and operated by the superheated steam passing through the distributor drives the blower.

19. The nuclear powered steam generator of claim 14 wherein the condensate is used as a lubricant for moving parts within the pressure vessel.

References Cited by the Examiner

UNITED STATES PATENTS

| 2,774,730 | 12/1956 | Young | 176—58 |
| 2,807,580 | 9/1957 | Fenning et al. | 176—58 |
| 2,940,915 | 6/1960 | Hammond et al. | 176—59 |
| 2,968,601 | 1/1961 | Evans et al. | 176—64 |
| 3,069,341 | 12/1962 | Daniels | 176—55 |

OTHER REFERENCES 845,804  8/1960  Great Britain.

CARL D. QUARFORTH, *Primary Examiner.*

L. DEWAYNE RUTLEDGE, *Examiner.*